(12) United States Patent
Simpson et al.

(10) Patent No.: US 6,301,623 B1
(45) Date of Patent: Oct. 9, 2001

(54) COMPUTER NETWORK WITH A PLURALITY OF IDENTICALLY ADDRESSED DEVICES

(75) Inventors: Peter Simpson, Holliston; Kurt Blacker, Oxford; Myles Kimmitt, Shrewsbury, all of MA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/220,430

(22) Filed: Dec. 24, 1998

(51) Int. Cl.[7] .................................................. G06F 15/16
(52) U.S. Cl. .......................... 709/253; 709/245; 709/250; 370/489
(58) Field of Search ............................... 710/62; 370/458, 370/503, 390, 422, 465, 431, 464, 489; 709/253, 254, 250

(56) References Cited

U.S. PATENT DOCUMENTS

| | | | |
|---|---|---|---|
| H1881 | * 10/2000 | Davis et al. ........................ | 370/458 |
| H1882 | * 10/2000 | Asthana et al. ...................... | 370/503 |
| 6,101,184 | * 8/2000 | Tobe et al. ............................ | 370/390 |
| 6,108,726 | * 8/2000 | Runaldue et al. .................... | 710/62 |
| 6,141,355 | * 10/2000 | Palmer et al. ........................ | 370/465 |
| 6,167,054 | * 12/2000 | Simmons et al. .................... | 370/422 |

* cited by examiner

*Primary Examiner*—Le Hien Luu
(74) *Attorney, Agent, or Firm*—McGlew & Tuttle, P.C.

(57) ABSTRACT

A computer network, and preferably a network concentrator, with a bidirectional serial channel. A plurality of devices on the channel are identified by addresses. The devices are divided into device groups and a device in one group can have an address which is identical to a device in another group. A management processor communicates with the individual devices by digital signaling through an analog multiplexer. The management processor decides which device group to communicate with, and then either generates a selection signal, or sends a data packet to a device register to generate a selection signal which causes the analog multiplexer to connect the bidirectional serial channel of the management processor to the bidirectional serial channel of the proper device group.

13 Claims, 5 Drawing Sheets

COMPUTER NETWORK WITH A PLURALITY OF IDENTICALLY ADDRESSED DEVICES

FIELD OF THE INVENTION

The present invention relates in general to a computer network with a plurality of communication channels feeding into a single management channel where a device on each of the communication channels all have an identical address. The present invention relates in particular to a network concentrator and the management of the devices on a plurality of cards in the concentrator.

BACKGROUND OF THE INVENTION

A network concentrator contains a plurality of modules for connecting together a plurality of stations. These modules can be roughly divided into management modules and communication or media modules. The communication modules connect to links which in turn connect to individual stations, or to other concentrators. The management modules control the operation of the communication modules, and the interaction between the communication modules. Management modules include modules which supply power to the communication modules, and modules which recognize and configure the communication modules for proper operation and interoperation.

In order for a management processor to recognize and configure the communication modules, the management processor must be able to read from, and write to, the individual devices on the communication and other modules. Because of the number of devices on a module, and the amount of communication involving these devices, it has been preferable to connect all the devices on a module to a common bidirectional serial channel. Each of the devices in the module has a unique address and can communicate with a management processor by sending or receiving a packet of information with the proper address.

As the size of computer networks grow, the number of stations increase, and correspondingly the number of communication modules in a concentrator increases. Also management modules, and particular the processor means of the management module are becoming more advanced, reducing in size, and in particular have a communication port with a single lead that is bidirectional.

A difficulty arises in that a single bidirectional lead of a microprocessor must be connected to each channel of a plurality of communication modules, where because of the limited number of addresses on the channels, and the large number of modules, several devices will have identical addresses. Digital multiplexing and digital demultiplexing have been previously used when the management processor had separate transmit and received ports for leads. However, digital multiplexers and demultiplexers are not bidirectional and therefore cannot be used with a bidirectional port or pin of a management processor.

SUMMARY AND OBJECTS OF THE INVENTION

It is a primary object of the present invention to allow communication between a bidirectional port of a management processor to a plurality of devices connected to different bidirectional serial channels, where devices on different channels may have identical addresses.

The present invention accomplishes this object by connecting each bidirectional serial channel of a plurality of devices to an output of an analog multiplexer. Although analog multiplexer posts are referred to as "input"and "output", they are, in fact, bidirectional. The bidirectional port of the management processor is connected to the input of the analog multiplexer. A selection means selects one of the serial channels for communication with the management processor, and generates a selection signal which is sent to the multiplexer. The multiplexer reads the selection signal, and connects the input of the multiplexer to the selected output of the multiplexer, where the output of the multiplexer is connected to the desired serial channel. Since an analog multiplexer is similar to a selection switch and is bidirectional, the management processor can communicate with the selected serial channel through the bidirectional port of the management processor.

The selection means can be part of the management processor, in which case the selection signal is transmitted from the management processor to the multiplexer. In an alternative, a device register can be connected to the bidirectional port of the management processor and receive data packets from the management processor. The data packets indicate one of the serial channels. The device register reads the packet and generates the selection signal based on the packet. This second embodiment is useful if the management processor is unable to send the selection signal directly to the multiplexer, due to such factors as the distance between the microprocessor and the multiplexer being too large to provide separate leads for the selection signal, or due to the processor not having enough outputs for a selection signal. The selection signal for a multiplexer is often a parallel signal requiring a plurality of individual signals, each with their own lead.

If the device register is used, there must be an available unique address for the device register so that the management processor can communicate with the device register over the bidirectional serial channel.

The present invention allows a management module to use a management processor with a bidirectional channel to communicate with a plurality of communication modules, where each communication module has its own bidirectional serial channel and devices which have channel addresses that are identical to the devices of other modules. The second embodiment is in particular advantageous, when the dividing of the lead from the bidirectional port of the management module into the separate channels of the communication modules occurs at a great distance from the management module.

In the preferred embodiment of the present invention, the bidirectional serial channel is an Inter-Integrated Circuit ($I^2C$ or I2C —developed by Philips Semiconductors) bus with a clock and a bidirectional serial data line intended to allow communication between integrated circuits (ICs). Each circuit on the bus has an address which consists of a part code and three user-configurable address bits. This would normally allow a maximum of eight of each type of IC to be connected to a single bus. The addressing capability can be expanded by using a simple bidirectional analog multiplexer to select among several destination busses.

The present invention allows expansion of I2C addressing, virtually without limit, by using a digitally controlled switching unit (analog multiplexer) to connect separate I2C busses to a common controller device. This allows addressing of multiple networks whose I2C devices may have overlapping device addresses. Additionally, in a second embodiment, the invention is expanded to allow this switching function to occur over the I2C bus itself, by use of an I2C register device to control the multiplexer selection inputs.

The I2C bus can be used in a network concentration in two places. One I2C bus is used by the management processor Enterprise Management Engine (EME) to read serial EEPROMs on each module installed in the concentrator. Another bus is used by the switch fabric to communicate with the Gigabit EtherNet I/O (GENIO) blades.

In a first embodiment, each slot or module has its own data line and all slots share two common clock lines (only one of which is active at any time). Each slot can contain up to 8 devices of the same type connected to each of the two clock lines and the common slot data line. This means that a concentrator with 16 slots times 8 devices of the same type per slot has 128 same type devices. Previous designs (with separate transmit and receive multiplexers) weren't useable, with a Motorola MPC860 processor that has only one bidirectional data pin. The present invention uses an analog multiplexer (basically a multiposition selector switch) to route the bidirectional data line to one of 16 possible slots.

A second embodiment involves four identical type I2C devices whose user address bits are hardwired to the same address. These four devices can not coexist on the same I2C bus. The present invention uses an I2C device register (the Philips PCF8574(A)T) to control an analog multiplexer. The device register sits on the I2C bus, and, by the management processor sending I2C commands to it, its outputs are used to control the channel selection inputs on the analog multiplexer. The multiplexer steers the bidirectional I2C data line to one of the four identical devices, thereby allowing them to reside on the same I2C bus.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
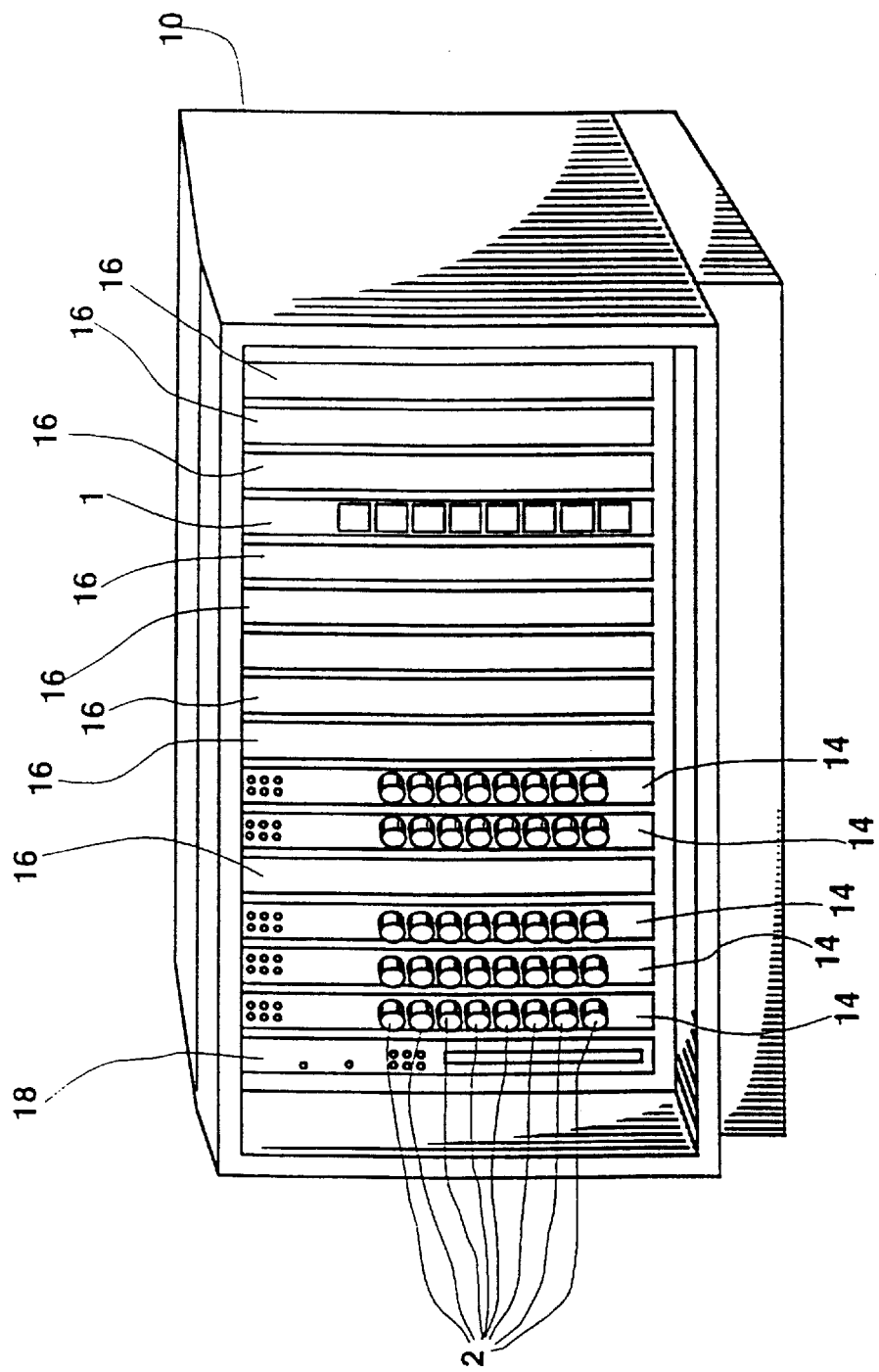
FIG. 1 is a view of a network concentrator with a plurality of modules.
Figure 2:
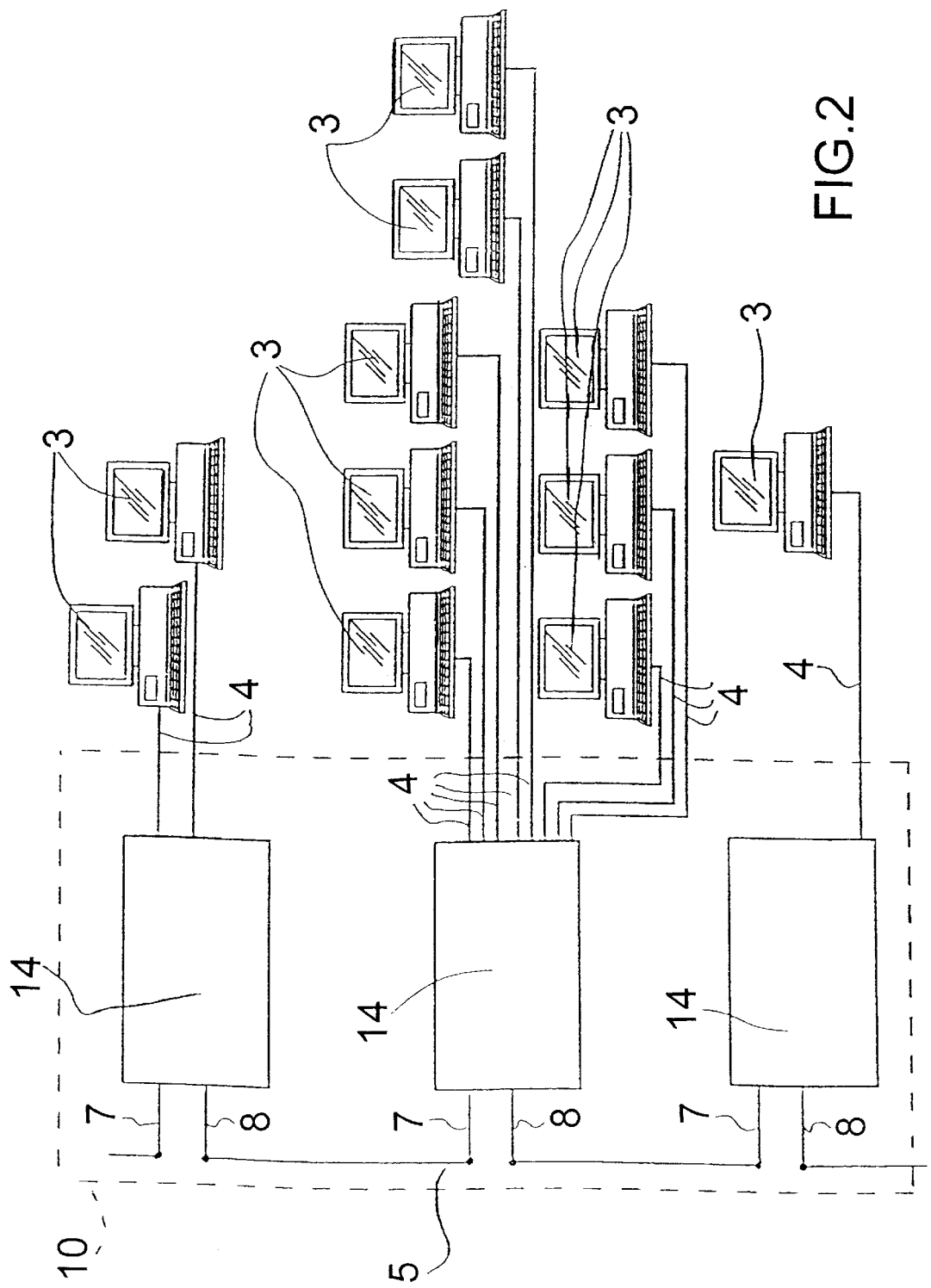
FIG. 2 is a schematic diagram of a plurality of stations connected to communication or media modules in a concentrator.

Referring to the drawings, and in particular to FIG. 1, a concentrator 10 has a plurality of slots 16 which can be filled with modules such as communication or media modules 14, a management module 1, and/or a power supply module 18. As shown in FIG. 2, a plurality of stations 3 can be connected to the media or communication modules 14 over links 4. The communication modules 14 connect to the backplane 5 of the concentrator 10 by connections 7 and 8.

Figure 4:
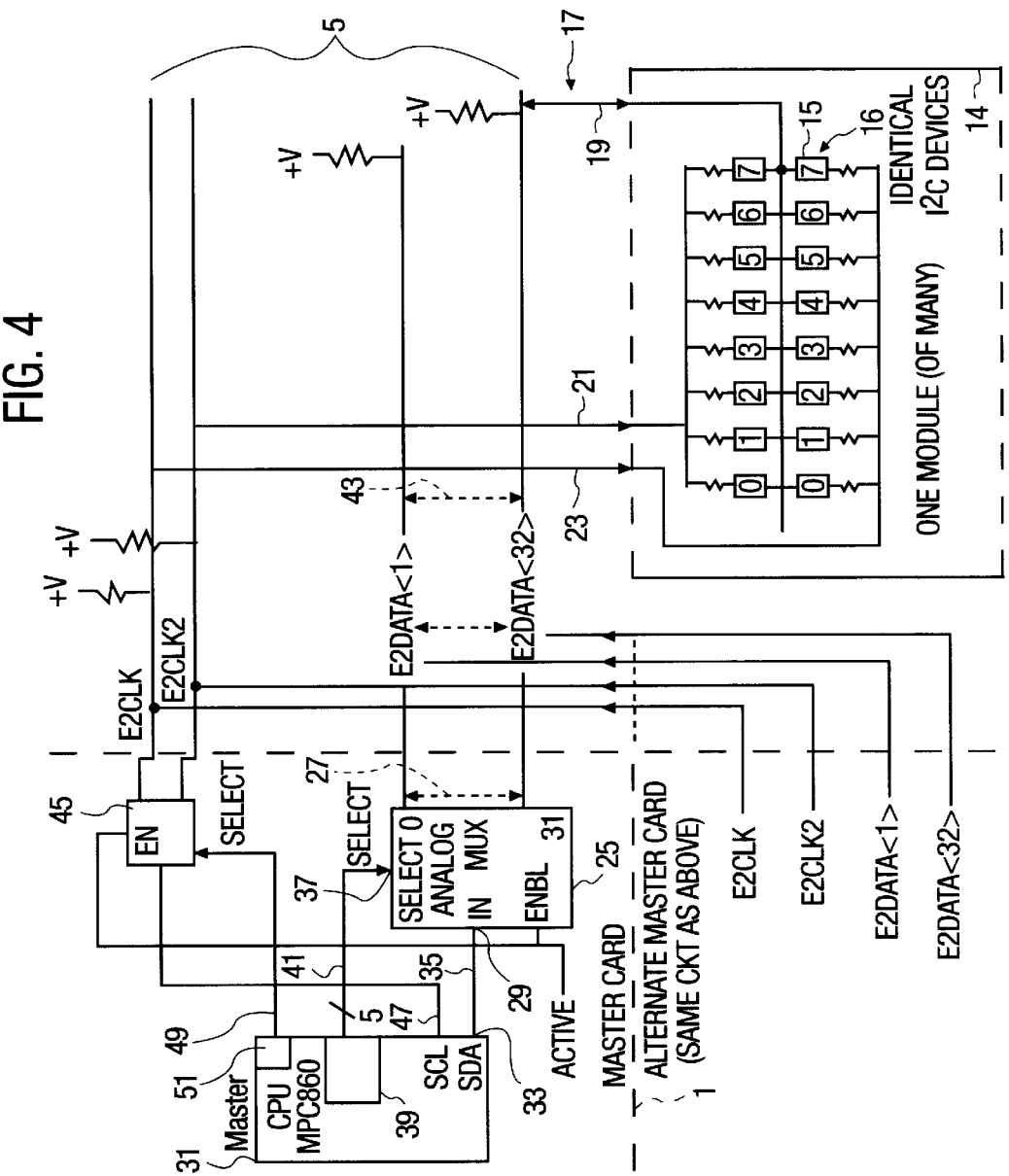
FIG. 4 is a schematic diagram of a first embodiment where the selection means is included in the management processor.

As shown in FIG. 4, each of the communication modules 14 has a plurality of devices 15. These devices are known as I2C devices and connect to a bidirectional serial channel 17, also referred to as an I2C bus. The bidirectional serial channel 17 preferably has a data line 19, a first clock line 21 and a second clock line 23. Each device 15 communicates over the bidirectional serial channel 17 to the management module or Mastercard 1 through the backplane 5 of a concentrator. Data is transferred back and forth by using packets with a destination address. Due to the limited number of addresses available on a channel, or due to the identical nature of the plurality of communication modules, a device on one communication module 14 could have the same address as another device 15 on another communication module 14.

The individual bidirectional serial channels 17 connect through the backplane 5 to an analog multiplexer 25. The analog multiplexer 25 has a plurality of outputs 27 and an input 29. The mastercard or management module 1 contains a management processor 31 with a bidirectional serial data port 33. The dataport 33 of the processor 31 is connected to the input 29 of the multiplexer 25 by a bidirectional data link 35.

The multiplexer 25 has a selection input 37 for receiving a signal indicating how to connect the input 29 to one of the outputs 27. The selection input 37 and the corresponding selection signal are preferably a parallel arrangement for a plurality of lines in a plurality of individual signals.

In a first embodiment, the multiplexer 25 and the management processor 31 are included in the management module 1. The multiplexer 25 and management processor 31 are also positioned so that the management module 31 can include a selection means 39 which generates the selection signal over selection line 41. When the management processor 31 desires to communicate with one of the devices 15 of a communication module 14, or even a power supply module 18 or any other module included in the concentrator 10, the selection means 39 transmits the proper selection signal over selection line 41 to the multiplexer 25. The multiplexer 25 then connects the multiplexer input 29 to the proper output 27 which is connected to the desired module 14, 18 or other module. This allows the management processor 31 to send a data packet through the bidirectional serial port 33 over the bidirectional data link 35, through multiplexer input 29, multiplexer output 27, through backplane 5, and into the bidirectional serial channel 17 of the proper module. There the proper device 15 according to the address on the data packet responds to the management processor 31.

Where the management processor 31 wishes to communicate with a different module, the selection means 39 generates a different selection signal, and the multiplexer 25 connects its input 29 to a different one of the outputs 27 according to the desired module. All data packets from and to the management processor 31 will then go along one of the lines of the backplane 5 which lead to the desired module. The management processor 31 is then able to communicate with the desired module using the bidirectional serial data part 33 of the management processor 31. FIG. 4 shows 32 backplane bidirectional data lines for connecting to one of each of the modules of the concentrator. Concentrators that have more or less slots would use correspondingly more or less backplane data lines.

Some modules will have such a large number of devices, to cause more than one device on a module to have the same address. When two devices have the same address in a module, one of the devices is connected to the first clock line 21 and the other device is connected to the second clock line 23. The clock lines 21 and 23 are connected to outputs of a clock multiplexer 45. The management processor 31 generates a clock signal on management clock line 47 which is connected to the input of the clock multiplexer 45. When the management processor 31 wishes to communicate with one of identically addressed devices on a module, the management processor 31 generates a clock selection signal onto clock selection line 49. The clock multiplexer then only enables the clock line 21 or 23, which is connected to the desired device 15. The management processor 31 has a clock selection means 51 for generating the clock selection signal.

It is possible for a concentrator 10 to have two management modules 1, with the second management module being a backup. In which case, the second management module would have all the same connections to the backplane as the first management module.

Figure 3:
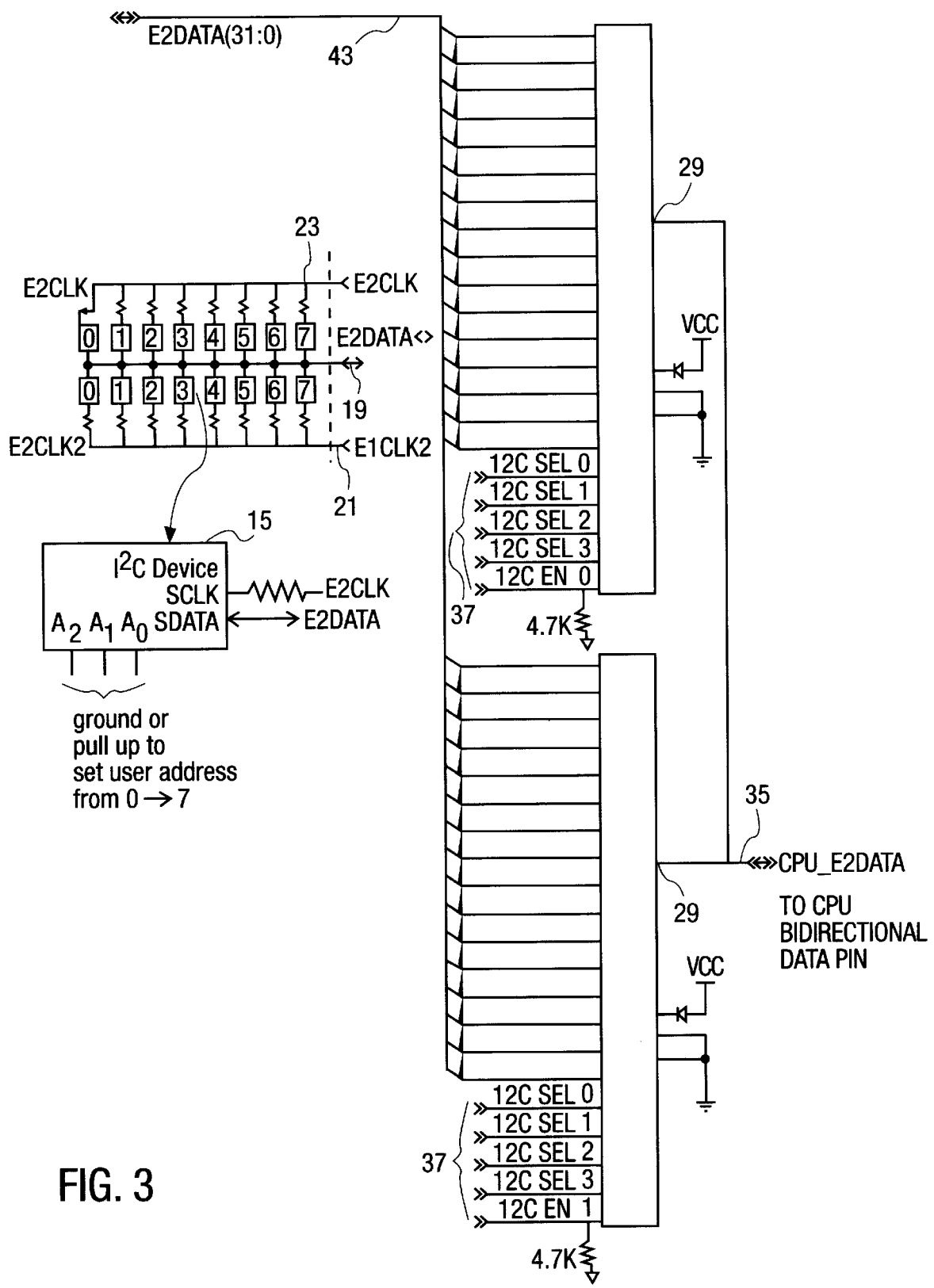
FIG. 3 is a schematic diagram of an analog multiplexer placed between a link to a CPU bidirectional data pin and a plurality of modules each having a plurality of individual devices connected to a bidirectional serial channel.

FIG. 3 shows how two independent analog multiplexers with 16 outputs can be connected to multiplex the bidirectional port 33 of management processor 31 to thirty two backplane bidirectional data lines 43.

Figure 5:
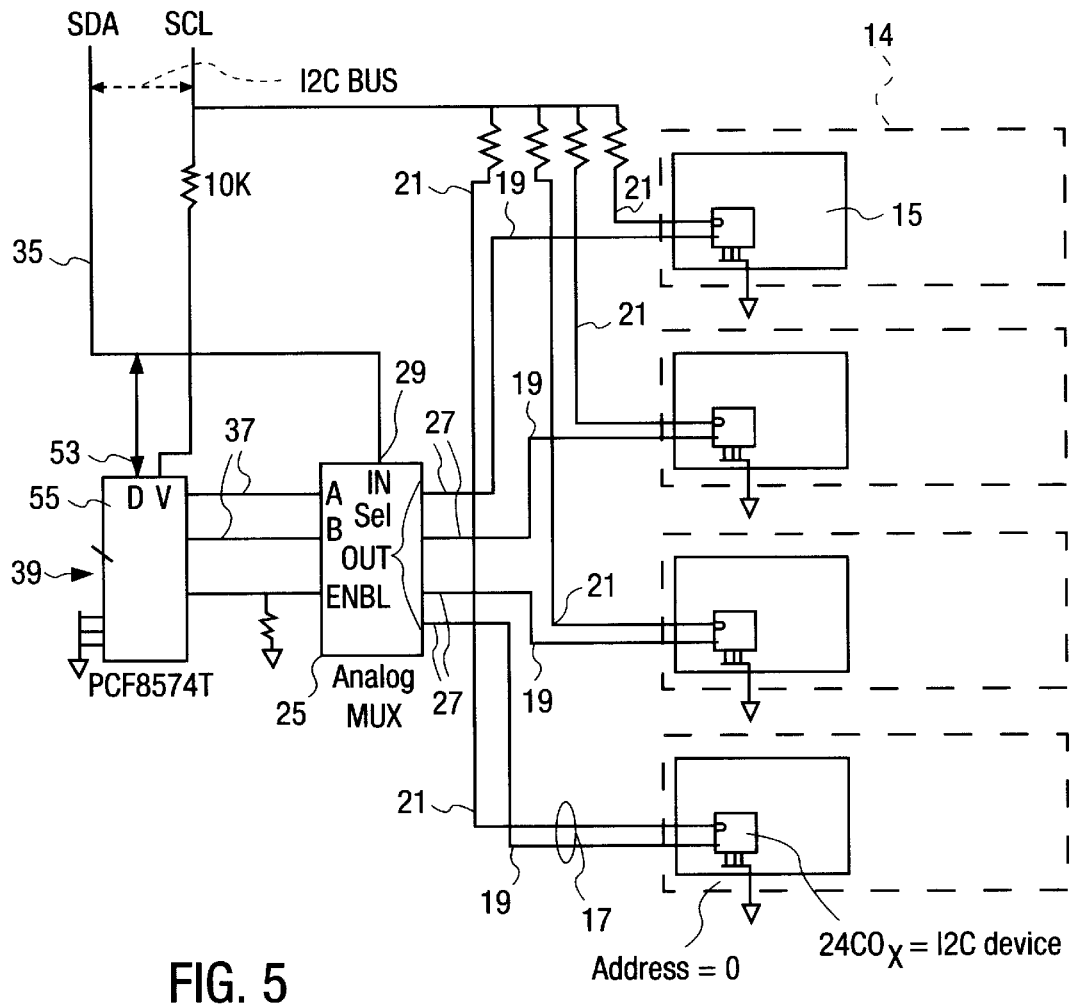
FIG. 5 is a schematic diagram of the second embodiment, where the selection means is a device register connected to the bidirectional serial channel.

In a second embodiment, as shown in FIG. 5, the selection means 39 is not part of the management processor 31. Instead the selection means 39 is preferably a device register 55 which has an input 53 connected to the bidirectional data link 35 from the management processor 31. The bidirectional data link 35 is also connected to the input 29 of the multiplexer 25. When the management processor 31 wishes to communicate with a specific card or module, the management processor 31 sends a data packet over the data link 35 with the address of the device register 55 acting as the selection means 39. The data portion of this packet contains the identity of the desired module. The device register 55 then uses this data portion to generate the selection signal and transmits the selection signal to the selection input 37 of the multiplexer 25. Then, as in FIG. 4, the multiplexer 25 connects the input 29 to the proper output 27 to connect the bidirectional data link 35 to the proper module. This embodiment is advantageous if the multiplexer 25 cannot be placed relatively close to the management processor 31, or if the management processor 31 can not generate its own selection signal. The second embodiment is disadvantageous, in that additional hardware is needed to create the selection means with a device register.

It is also possible for the bidirectional serial channel in the second embodiment to contain first and second clock lines and for there to be a clock selection means and a clock multiplexer. Since the clock multiplexer is a unidirectional device, a digital multiplexer can be used. The devices 15 of the modules, and the management processor 31 communicate using digital signals. Note that it is important that the device register 55 acting as the selection means 39 has an address different from the devices 15 on the modules.

While specific embodiments of the invention have been shown and described in detail to illustrate the application of the principles of the invention, it will be understood that the invention may be embodied otherwise without departing from such principles.

What is claimed is:

1. A computer network comprising:
   a plurality of devices divided into a plurality of device groups;
   a bidirectional serial channel for each of said device groups, each serial channel being connected to said plurality of devices in a respective said device group, said each serial channel operating a protocol with a plurality of addresses, each of said addresses being associated with one of said plurality of devices in said respective device group;
   a multiplexer having an input and a plurality of outputs, each of said outputs being connected to one of said serial channels;
   management processor means with a bidirectional data port for communicating with said plurality of devices, said bidirectional data port being connected to said input of said multiplexer;
   selection means for selecting one of said device groups and sending a selection signal to said multiplexer causing said multiplexer to connect said input of said multiplexer to one of said outputs of said multiplexer which is connected to said serial channel of said selected one of said device groups.

2. A computer network in accordance with claim 1, wherein:
   said protocol of said bidirectional serial channels include a maximum number of addresses;
   a number of said devices in each said device group is less than or equal to said maximum number of addresses, a total number of said plurality of devices is larger than said maximum number of addresses.

3. A computer network in accordance with claim 1, wherein:
   one said device from each of said device groups all have an identical address.

4. A computer network in accordance with claim 1, wherein:
   said plurality of devices and said management processor means communicate with each other using digital signals;
   said multiplexer performs analog multiplexing.

5. A computer network in accordance with claim 1, wherein:
   each of said plurality of device groups is arranged in separate device modules of a concentrator;
   said concentrator has a backplane, said outputs of said multiplexer being connected to said bidirectional serial channels through said backplane.

6. A computer network in accordance with claim 1, wherein:
   said bidirectional serial channel includes a data line and a clock line.

7. A computer network in accordance with claim 1, wherein:
   said bidirectional serial channel includes a data line, a first clock line and a second clock line;
   said devices in each said device group being divided into a first set connected to said data line and said first clock line, and being divided into a second set connected to said data line and said second clock line, a number of said devices in each of said first and second sets being less than or equal to said maximum number of addresses, a total number of said plurality of devices in both said first and second sets being larger than said maximum number of addresses;
   said management processor includes a clock selection means for selecting one of said first and second sets of said devices for communication with said management processor means, said clock selection means only enabling one of said first and second clock lines depending on said selected one of said first and second sets.

8. A computer network in accordance with claim 1, wherein:

said selection means includes a device register connected to said bidirectional data port of said management processor, said management processor means sending a selection packet to said device register indicating one of said device groups, said device register reading said selection packet from said port of said management processor means and generating said selection signal according to said selection packet.

9. A computer network in accordance with claim 8, wherein:

an address of said device register is different said addresses of said devices.

10. A computer network in accordance with claim 1, wherein:

said management processor means includes said selection means, and said selection signal is transmitted from said management processor means to said multiplexer; said management processor means and said multiplexer are arranged in a management module of said concentrator.

11. A computer network comprising:

a plurality of devices divided into a plurality of device groups;

a bidirectional serial channel for each of said device groups, each serial channel operating a protocol with a maximum number of addresses, a number of said devices in each said device group being less than or equal to said maximum number of addresses, a total number of said plurality of devices being larger than said maximum number of addresses;

a multiplexer having an input and a plurality of outputs, each of said outputs being connected to one of said serial channels;

management processor means with a bidirectional data port for communicating with said plurality of devices, said bidirectional data port being connected to said input of said multiplexer;

selection means for selecting one of said device groups and sending a selection signal to said multiplexer causing said multiplexer to connect said input of said multiplexer to one of said outputs of said multiplexer which is connected to said serial channel of said selected one of said device groups.

12. A computer network comprising:

a plurality of devices divided into a plurality of device groups;

a bidirectional serial channel for each of said device groups, each serial channel operating a protocol with a plurality of addresses, one said device from each of said device groups all having an identical address;

a multiplexer having an input and a plurality of outputs, each of said outputs being connected to one of said serial channels;

management processor means with a bidirectional data port for communicating with said plurality of devices, said bidirectional data port being connected to said input of said multiplexer;

selection means for selecting one of said device groups and sending a selection signal to said multiplexer causing said multiplexer to connect said input of said multiplexer to one of said outputs of said multiplexer which is connected to said serial channel of said selected one of said device groups.

13. A computer network comprising:

a plurality of devices divided into a plurality of device groups;

a bidirectional serial channel for each of said device groups, each serial channel operating a protocol with a plurality of addresses;

a multiplexer performing analog multiplexing and having an input and a plurality of outputs, each of said outputs being connected to one of said serial channels;

management processor means with a bidirectional data port for communicating with said plurality of devices, said bidirectional data port being connected to said input of said multiplexer, said plurality of devices and said management processor means communicating with each other using digital signals;

selection means for selecting one of said device groups and sending a selection signal to said multiplexer causing said multiplexer to connect said input of said multiplexer to one of said outputs of said multiplexer which is connected to said serial channel of said selected one of said device groups.

* * * * *